B. F. SNYDER.
SLIDING SAWMILL CRANK.
Patented Sept. 29, 1836.
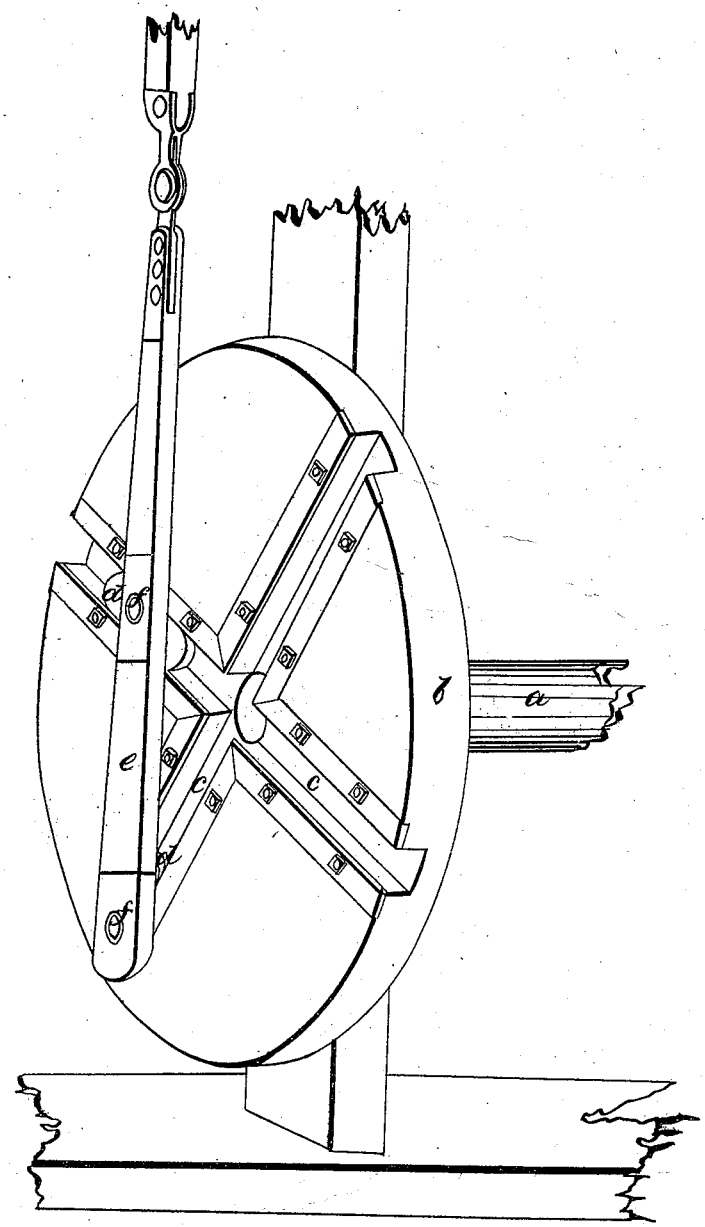

UNITED STATES PATENT OFFICE.

BENJAMIN F. SNYDER, OF ELMIRA, NEW YORK.

SLIDING CRANK FOR SAWMILLS.

Specification of Letters Patent No. 35, dated September 29, 1836.

*To all whom it may concern:*

Be it known that I, BENJAMIN F. SNYDER, of Elmira, in the county of Chemung (late Tioga county) and State of New York, have invented a new and useful Improvement called the "Sliding Sawmill-Cranks," and that the following is a full and exact description of the said machine as invented by me, a new improvement called the "sliding sawmill-cranks," which is to be applied to the balance-wheel of the sawmill for the purpose of increasing the motion of the saw-gate in order that the saw may perform two strokes to one revolution of the balance-wheel.

This balance wheel is placed on a gudgeon or shaft, and directly under the center of the saw gate and is placed and turns in a vertical division. In this wheel are placed two rabbets of about three, or four inches wide, crossing each other at the center of the balance wheel and at right angles to each other, the length of each rabbet being equal to the diameter of the balance wheel, these rabbets, to be formed by bolting or countersinking straight guides called the wheel rabbeted guides. Two slides of about twenty two inches in length or of such other length as may be thought necessary are formed to move one in each of the above mentioned rabbets, the rabbeted guides being so contrived as to confine the slides within the rabbets, and so as to tighten, or loosen the sides at pleasure by bolting, screwing, keying, or otherwise. Each slide is fastened to the pitman by means of a gudgeon, or wrist placed in the center of the slide. These gudgeons or wrists may be about four or five inches in length, two or two and a half inches in diameter, and made accurately round. They revolve in boxes fixed in the pitman, the lower box to be placed in the pitman about six inches from the lower end, the upper box is to be at a sufficient distance from the lower one to make the movement of the saw-gate of such extent as may be thought necessary, which movement will be equal in extent to the distance at which the centers of the above mentioned wrists or gudgeons are from each other. The diameter of the balance wheel to be such as to permit the full play of the slides, and the slides not of such length as to interfere with each other.

The invention claimed by me to be new in the above specification is as follows:

The application of the above described slides moving in rabbets crossing each other on said wheel to the purpose of making the saw-gate perform two strokes at one revolution of the above mentioned wheel.

BENJAMIN F. SNYDER.

Witnesses:
  A. S. HILLS,
  JOHN A. GILLET.